United States Patent [19]

Kress et al.

[11] 4,102,594
[45] Jul. 25, 1978

[54] FLOATING REAMER

[75] Inventors: Dieter Kress, Aalen; Friedrich Häberle, Lauchheim, both of Fed. Rep. of Germany

[73] Assignee: MAPAL Fabrik fur Prazisionswerkzeuge Dr. Kress KG, Aalen, Fed. Rep. of Germany

[21] Appl. No.: 738,327

[22] Filed: Nov. 2, 1976

[30] Foreign Application Priority Data

Nov. 4, 1976 [DE] Fed. Rep. of Germany ....... 2549325

[51] Int. Cl.² .................. B23B 29/02; B23B 51/00; B23B 27/16
[52] U.S. Cl. .................................. 408/186; 408/197
[58] Field of Search .............. 408/127, 186, 197, 199, 408/714, 144, 157, 153, 185, 240, 181; 279/16, 18; 10/89 F; 144/230

[56] References Cited

U.S. PATENT DOCUMENTS

| | | | |
|---|---|---|---|
| 1,241,177 | 9/1917 | Watts | 279/16 |
| 1,810,503 | 6/1931 | Thomas | 279/16 |
| 2,043,862 | 6/1936 | Newman | 10/89 F |
| 2,661,218 | 12/1953 | Snow et al. | 408/181 X |
| 3,591,305 | 7/1971 | Aichhorn | 408/240 X |
| 3,802,712 | 4/1974 | Bernatti | 279/18 |
| 4,011,025 | 3/1977 | Kress | 408/181 X |

*Primary Examiner*—Othell M. Simpson
*Attorney, Agent, or Firm*—Hans Berman

[57] ABSTRACT

A floating reamer whose cutting head is axially secured to the shank but movable transversely to the parallel axes of the shank and the cutting head toward and away from a position of coincidence of the axes. Pairs of slidably engaged respective guide faces on one axial end of the shank and on the head are parallel and substantially perpendicular to the axes respectively. Two cutting blades project from the cutting head in opposite radial directions and are normally fixed to the head.

6 Claims, 8 Drawing Figures

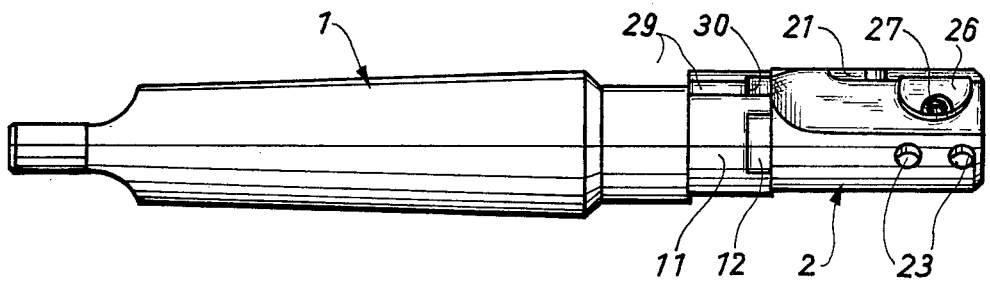
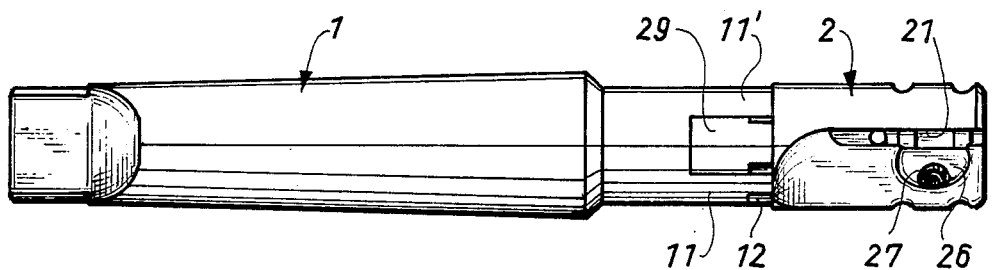
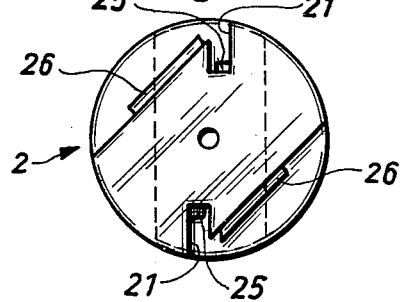
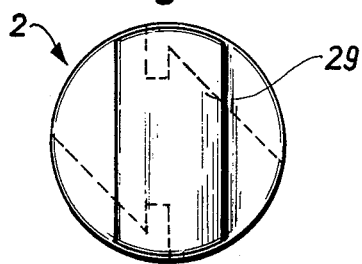

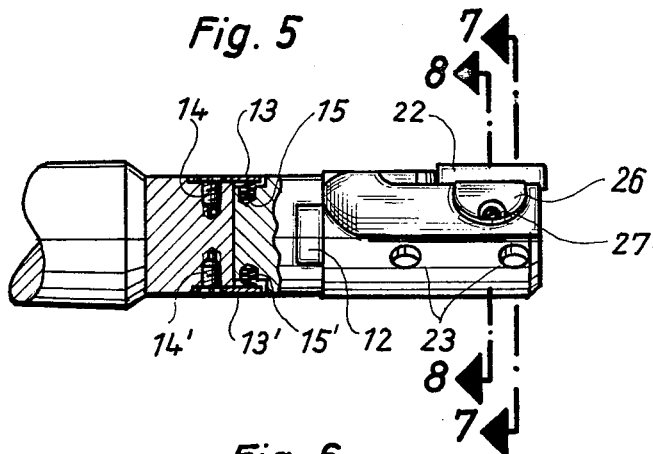
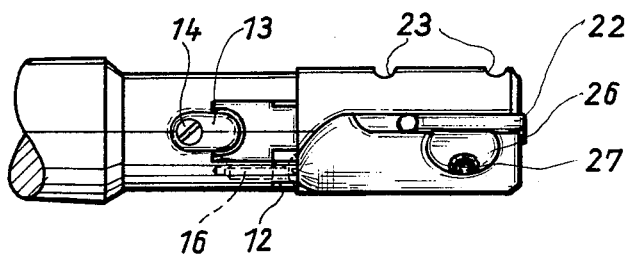
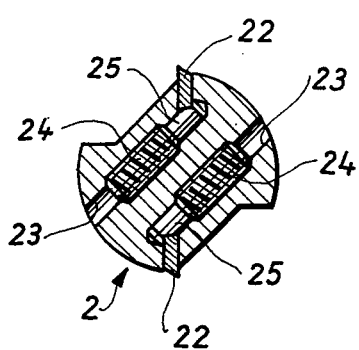 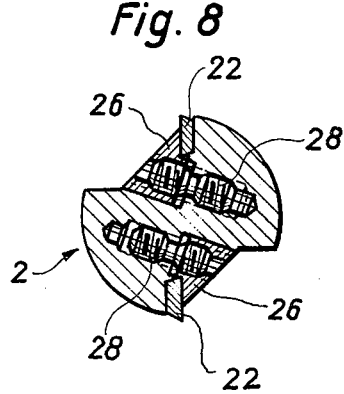

FLOATING REAMER

This invention relates to machine tools, and particularly to a floating reamer having two diametrically opposite cutting blades on its cutting head, the blades being capable of joint, limited movement transverse to the axis of reamer rotation.

In a typical, known, floating reamer (German published application No. 1,299,493), two cutting blades are juxtaposed in area contact in a radial opening of a blade holder. They may be adjusted relative to each other and move jointly in the opening within limits set by threaded abutments. The known reamer does not, and cannot, permit adjustment of the blades as to the angle between a secondary cutting edge and the axis of rotation, thereby limiting the field of reamer application. The blades employed need to have transverse openings which structurally weaken the blades so that the blades must be relatively large, and the use of reversible blades having two alternatively exposed parallel cutting edges is not possible in the known device.

A primary object of the invention is the provision of a floating reamer in which the blades may be relatively small, preferably reversible, and apable of being adjusted as to the position of the secondary cutting edge.

With these and other objects in view, the invention provides a floating reamer whose diametrically opposite cutting blades are fixedly mounted on a cutting head during tool operation, whereas guide faces on the reamer shank and the cutting head are engaged in a plane parallel to the axes of the shank and head and in a plane substantially perpendicular to the parallel axes of shank and head.

Other features, additional objects, and many of the attendant advantages of this invention will readily be appreciated as the same becomes better understood by reference to the following detailed description of a preferred embodiment when considered in connection with the appended drawing in which:

FIG. 1 shows an incomplete reamer of the invention in side elevation;

FIG. 2 is a top plan view of the reamer of FIG. 1;

FIG. 3 shows the cutting head of the reamer in front elevation;

FIG. 4 shows the cutting head in rear elevation separate from the shank;

FIG. 5 shows the reamer in fragmentary side-elevational view, and partly in section on its axis;

FIG. 6 is a top plan view of the device of FIG. 5; and

FIGS. 7 and 8 illustrate the reamer head of FIG. 5 in respective sections on the lines 7—7 and 8—8.

To the extent illustrated in FIGS. 1 and 2, the reamer of the invention has a shank 1 and a cutting head 2 whose axes are parallel, but radially offset from each other in the view of FIG. 1. Elements removed for the showing of FIG. 1 normally limit the radial offset of the cutting head 2 to less than is shown. Two diametrically opposite, axially elongated slots 21 in the circumferential face of the head 2 receive elongated, flat, plate-shaped cutting blades 22 (FIG. 5). Two axially spaced pairs of transverse bores 23 in the cutting head 2 intersecting respective slots 21 receive set screws 24 which each back a wedge 25. Threaded adjustment of the screws 24 permits limited radial adjustment of each blade by the engaged wedges 25 and any angular adjustment of the inclination of its axial or secondary cutting edge relative to the axes of the shank 1 and the head 2, as is best seen in FIG. 7.

Each blade 22 is secured in its adjusted position by a clamping jaw 26 which presses the associated blade against the axial wall of the head 2 in a slot 21 which trails during normal reamer rotation. As is conventional in itself, a recess 27 in the jaw 26 receives the head of a clamping screw 28 whose threaded shank matingly engages a bore in the head 2 (see FIG. 8).

The rear end of the head 2, that is, its end axially adjacent the shank 1, carries an integral slide 29. As is best seen in FIG. 2, the slide has two opposite and parallel guide faces parallel to he axes of the shank 1 and head 2, and another guide face transversely connecting the axial faces and practically perpendicular to the axes over its full width. The adjacent axial end of the shank is forked, and the axially terminal branches 11, 11' of the shank are separated by a groove whose three planar walls coformingly engage respective guide faces of the slide 29. A retaining lug 12 is partly received in an opening in the branch 11 and secured thereto by a screw 16 (FIG. 6). It engages a recess 30 in one of the axial guide faces of the slide 29 and prevents axial release of the head 2 from the shank 1.

In the operative condition of the reamer shown in FIGS. 5 and 6, two abutment plates 13, 13' are fastened to the shank 1 in diametrically opposite recesses by screws 14, 14' and limit the free radial movement of the slide 29 in its path between the branches 11, 11'. Helical springs 15, 15' partly recessed in the axial end faces of the slide 29 transverse to the axial guide faces engage the abutment plates 13, 13' during the radial oscillations of the cutting head to damp the oscillations.

As is best seen in FIG. 8, the cutting blades 22 have a trapezoidal cross section, known in the reversible blades of other reamers but not capable of being used heretofore in floating reamers. When the exposed cutting edges of the blades 22 become dull, the screws 28 are turned to release the blades frm the jaws 26, the blades are reversed to expose the parallel, longitudinal edges previously engaged by the wedges 25, and the reversed blades are fixedly fastened again. A similar procedure is followed when it is desired to change the angle defined by a cutting edge and the axis of the head 2.

The floating reamer illustrated in the drawing and described hereinabove may be modified in many ways without loss of all its advantageous features. More specifically, blade clamping and adjusting mechanisms other than those specifically disclosed many be resorted to within obvious limits. While reversible blades of conventional shape are preferred because they are staple articles of commerce, at least some of the advantages of the invention are available with differently shaped blades, conventional or otherwise, to suit specific operating conditions. The relationship of engaged or engageable elements may be reversed. Thus, the rear end of the cutting head may be forked to receive a slide portion of the shank at some loss of stability capable of being held to a minimum with careful design and selection of materials. The springs 15, 15' which damp radial oscillation of the cutting head 2 toward and away from a position of coincidence of the head and shank axes may be mounted in the abutment plates 13, 13', and the like.

It should be understood, therefore, that the foregoing disclosure relates only to a presently preferred embodiment of this invention, and that it is intended to cover all changes and modifications in the example of the invention herein chosen for the purpose of the disclosure which do not constitute departures from the spirit and scope of the invention set forth in the appende claims.

What is claimed is:

1. A floating reamer comprising:
   (a) a shank having an axis of rotation,
      (1) one axial end portion of said shank being forked into two branches radially defining a recess therebetween and having respective guide faces in said recess,
      (2) said guide faces being parallel to said axis of rotation,
      (3) said shank having a third guide face axially bounding said recess and substantially perpendicular to said axis;
   (b) a cutting head having an axis and three guide faces slidably engaging said guide faces of said shank respectively in said recess,
      (1) two guide faces of said cutting head being parallel to and equidistant from the axis of said cutting head, and the third guide face of said cutting head being substantially perpendicular to the axis of said cutting head,
      (2) the engaged guide faces of said shank and of said cutting head jointly constituting guide means for guiding said cutting head on said shank in a path toward and away from a position in which said axes coincide;
   (c) a securing lug projecting from one of said branches into said recess, one of the two parallel guide faces of said cutting head being formed with a groove movably receiving said lug for axially securing said cutting head to said shank;
   (d) two cutting blades mounted on said cutting head,
      (1) each of said blades having at least one cutting edge elongated in the direction of the axis of said cutting head and projecting from said cutting head in opposite radially outward directions substantially parallel to said two guide faces of said cutting head,
      (2) whereby said cutting head oscillates in said path under alternating stresses applied to said cutting edges;
   (e) means for radially adjusting each blade on said cutting head and for fixedly securing each blade in the adjusted position; and
   (f) two abutment members mounted on said shank and projecting into said path to limit movement of said cutting head away from said position.

2. A reamer as set forth in claim 1, further comprising two resilient damping members mounted on said cutting head and directed toward said abutment members respectively for movement limiting engagement with said abutment members.

3. A reamer as set forth in claim 2, wherein said damping members are helical compression springs having respective axes radial relative to the axis of said cutting head, whereby each spring when compressed by an engaged abutment member biases said cutting head toward said position thereof.

4. A reamer as set forth in claim 1 further comprising means for varying the angle defined by the at least one cutting edge of each blade and the axis of the cutting head.

5. A reamer as set forth in claim 4, wherein each of said blades is elongated in said direction and has two longitudinal cutting edges, said cutting head being formed with two radially open recesses respectively receiving said blades, one of the cutting edges of each blade radially projecting from said cutting head, the other cutting edge being received in the associated recess and facing inward of said recess.

6. A reamer as set forth in claim 5, further comprising means for securing each blade in a position in which the angle defined by said at least one cutting edge and the axis of the cutting head is acute, the other cutting edge being parallel to said at least one cutting edge.

* * * * *